(12) United States Patent
Quesnel et al.

(10) Patent No.: US 11,535,176 B2
(45) Date of Patent: Dec. 27, 2022

(54) MODULAR TRIM ELEMENT

(71) Applicant: FAURECIA INTERIEUR INDUSTRIE, Nanterre (FR)

(72) Inventors: Benjamin Quesnel, Valencia (ES); Ludovic Bouldron, Alcobendas Madrid (ES); Cedric Habert, Essuiles (FR); Stephane Snoeck, Mongneville (FR); Edouard Da Silva, Herblay (FR); Stevenn Bideau, Sur Yvette (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 199 days.

(21) Appl. No.: 16/934,903

(22) Filed: Jul. 21, 2020

(65) Prior Publication Data
US 2021/0024013 A1 Jan. 28, 2021

(30) Foreign Application Priority Data

Jul. 22, 2019 (FR) ................................ FR 19 08280

(51) Int. Cl.
*B60R 13/02* (2006.01)
*B60N 2/22* (2006.01)
*B60R 7/04* (2006.01)

(52) U.S. Cl.
CPC ............ *B60R 13/0262* (2013.01); *B60N 2/22* (2013.01); *B60R 7/043* (2013.01);
(Continued)

(58) Field of Classification Search
CPC ........ B60R 2013/0293; B60R 13/0275; B60R 13/0262; B60N 2/22
(Continued)

(56) References Cited

U.S. PATENT DOCUMENTS

| 4,620,335 A * | 11/1986 | Dodgen | ................ | A47C 17/80 |
| | | | | 5/118 |
| 2003/0122397 A1* | 7/2003 | Maibom | .............. | B60N 2/3011 |
| | | | | 296/69 |

(Continued)

FOREIGN PATENT DOCUMENTS

| EP | 1228923 A2 * | 8/2002 | ........... B60N 2/4613 |
| EP | 2030842 A2 * | 3/2009 | ............ B60N 2/206 |

(Continued)

OTHER PUBLICATIONS

French Search Report corresponding to French Application No. FR 1908280, dated Jun. 4, 2020, 2 pages.

*Primary Examiner* — D Glenn Dayoan
*Assistant Examiner* — Kevin P Weldon
(74) *Attorney, Agent, or Firm* — Reising Ethington P.C.

(57) ABSTRACT

A module trim element having a body defining an upper bearing surface, at least one first covering element defining a first upper bearing surface, mounted rotating about a first axis of rotation between a retracted position and at least one deployed position, and at least one second covering element defining a second upper bearing surface and mounted rotating about a second axis of rotation between a retracted position and at least one deployed position. The first axis of rotation and the second axis of rotation are substantially parallel and extend at different heights relative to the body, with at least one of the upper bearing surfaces being a flexible surface and at least another one of the upper bearing surfaces being a rigid surface.

11 Claims, 8 Drawing Sheets

(52) U.S. Cl.
CPC .. *B60R 13/0275* (2013.01); *B60R 2013/0287* (2013.01); *B60R 2013/0293* (2013.01)

(58) Field of Classification Search
USPC .................. 296/24.34, 37.5, 37.8, 65.09, 69
See application file for complete search history.

(56) References Cited

U.S. PATENT DOCUMENTS

| | | | |
|---|---|---|---|
| 2007/0085363 A1* | 4/2007 | Sturt | B60R 7/04 296/37.8 |
| 2007/0205623 A1* | 9/2007 | Hung | B60R 7/04 296/208 |
| 2007/0296234 A1* | 12/2007 | Sturt | B60R 7/04 296/24.34 |
| 2011/0140472 A1* | 6/2011 | Vander Sluis | B60R 11/00 296/24.34 |
| 2016/0276865 A1 | 9/2016 | Pike et al. | |
| 2018/0265010 A1 | 9/2018 | Line et al. | |

FOREIGN PATENT DOCUMENTS

| | | |
|---|---|---|
| JP | H01114332 U | 8/1989 |
| JP | 2003080982 A | 3/2003 |
| WO | WO2015077239 A1 | 5/2015 |

* cited by examiner

MODULAR TRIM ELEMENT

TECHNICAL FIELD

The present invention relates to a vehicle trim element, such as a vehicle center console.

The invention also relates to a vehicle comprising such a trim element.

BACKGROUND

Such a trim element is generally arranged to offer several functions to the passengers of the vehicle.

To that end, the trim element for example comprises a bearing surface for the elbow and forearm of the passengers to offer an armrest function, and a storage area extending below the bearing surface to offer a coin tray function. The bearing surface is then movable between a retracted position, in which it covers the storage space, and a deployed position, in which it frees access to the storage space.

However, the number of functions offered by the trim element remains limited and the arrangement of the trim element does not make it possible to offer additional ones.

SUMMARY

One aim of the invention is to address this drawback by proposing a trim element arranged to offer an increased number of functions.

To that end, the invention relates to a vehicle trim element comprising:
- a body defining an upper bearing surface,
- at least one first covering element defining a first upper bearing surface, said first covering element being mounted rotatably about a first axis of rotation between a retracted position, in which the first covering element extends over the upper surface of the body, and at least one deployed position, in which the first covering element frees access to said upper bearing surface of the body,
- at least one second covering element defining a second upper bearing surface, said second covering element being mounted rotatably about a second axis of rotation between a retracted position, in which the second covering element extends over the first upper surface and wherein the second upper bearing surface is accessible, and at least one deployed position, in which the second covering element frees access to said first upper bearing surface,
- the first axis of rotation and the second axis of rotation being substantially parallel to one another and extending at different heights relative to the body,
- at least one of the upper bearing surfaces of the body, the first covering element and the second covering element being a flexible surface and at least one other of the upper bearing surfaces of the body, the first covering element and the second covering element being a rigid surface.

By providing at least two covering elements that are movable relative to the body between retracted and deployed positions, it is possible for the passengers of the vehicle to have access to different bearing surfaces formed by the body and by the covering elements, these bearing surfaces being suitable, in particular due to their shape and/or their rigidity, for offering different functions to the passengers.

Thus for example, the second upper bearing surface can be used to form an armrest while being formed by a flexible or rigid bearing surface, the first upper bearing surface to form a tray while being formed by a rigid bearing surface and the upper bearing surface of the body to form a seat while being formed by a flexible bearing surface.

The inventive trim element may include any of the following features, considered alone or according to any technically possible combination:
- the first covering element is articulated on the body about a first axis of rotation and the second covering element is articulated on the first covering element about the second axis of rotation;
- the upper bearing surface of the body is a flexible bearing surface, a lower surface of the first covering element, opposite the upper bearing surface, being a flexible surface;
- in a first deployed position of the first covering element, the upper bearing surface of the body forms the seat bottom of a seat and the lower surface of the first covering element forms the backrest of said seat, the angle of rotation between the retracted position and the deployed position being substantially comprised between 90° and 120°;
- the first covering element is movable into at least one second deployed position in which the lower surface of the first covering element extends substantially in the continuation of the upper bearing surface of the body and forms a berth with said upper bearing surface;
- the first upper bearing surface is a rigid upper bearing surface forming a table;
- a lower surface of the second covering element, opposite the second upper bearing surface, is a rigid bearing surface and extends in the continuation of the first upper bearing surface in the deployed position of the second covering element and forms a table with said upper bearing surface;
- it further comprises a third covering element comprising a lower surface, said third covering element being articulated to the first covering element about a third axis of rotation, extending on an edge of the first covering element opposite the edge on which the first axis of rotation extends, said third covering element being movable between a retracted position, in which the lower surface of the third covering element is applied on the first upper bearing surface, and a deployed position, in which said lower surface extends in the continuation of the first upper bearing surface and forms a table with said upper bearing surface;
- said trim element is a vehicle center console;
- at least one storage space extends in the body, said storage space being accessible by at least one side wall of said body;
- the trim element further comprises at least one tray that is translatable relative to the body, the first covering element or the second covering element, between a retracted position, in which the tray extends in the body, in the first covering element or in the second covering element, and at least one deployed position, in which the tray protrudes from the body, the first covering element or the second covering element, said tray comprising at least one cavity and/or orifice for receiving an object and/or at least one device for recharging a battery of a roaming electronic device positioned on the tray.

The invention also relates to a vehicle comprising a trim element as described above.

According to one optional feature of the vehicle, the vehicle comprises a floor on which the body of the trim element is mounted, said trim element being translatable relative to said floor.

BRIEF DESCRIPTION OF THE DRAWINGS

Other aspects and advantages of the invention will appear upon reading the following description, provided as an example, and done in reference to the appended drawings, in which.

DETAILED DESCRIPTION

In the description, the terms "lower" and "upper" are defined relative to an elevation direction corresponding to the height of a vehicle.

Figure 1:
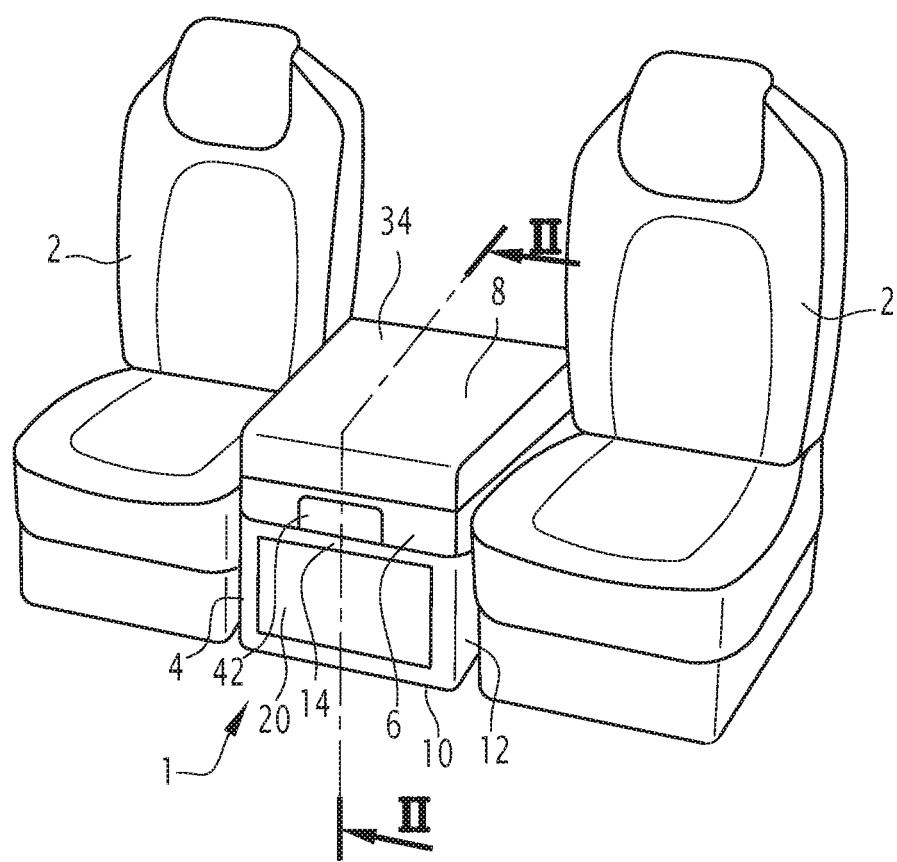
FIG. 1 is a schematic perspective illustration of part of a vehicle passenger compartment comprising a trim element according to an embodiment of the invention, the trim element being in a retracted configuration.

In reference to FIG. 1, a trim element 1 is described, forming a center console of a vehicle, for example a motor vehicle. Such a trim element 1 is positioned between the front seats 2 of a vehicle. It is, however, understood that the invention could apply to other types of trim elements, such as a vehicle rear console or a side jump seat extending next to a seat of the vehicle. The remainder of the disclosure will be done in reference to a trim element 1 forming a vehicle center console, as shown in the figures.

The trim element 1 comprises a body 4 and at least one first covering element 6 and one second covering element 8 that are rotatable relative to the body 4.

The body 4 comprises a base 10 that is for example mounted on the floor 5 of the vehicle between the front seats 2 of the vehicle. The body 4 for example comprises side walls 12 extending along the elevation direction of the vehicle from the base 10 and delimiting an inner volume therewith. Opposite the base 10, the inner volume is closed by an upper wall 14.

The body 4 defines an upper bearing surface 16 extending toward the outside of the trim element 1.

According to the embodiment shown in the figures, the upper bearing surface 16 is flexible, that is to say, it has a certain deformability, in particular toward the inner volume of the body 4 when a bearing force is exerted on the upper bearing surface 16.

Such flexibility is for example obtained by covering the upper wall 14 of the body 4 with a layer of flexible material 18, for example a foam optionally covered with a textile, leather or other material. The layer of flexible material 18 and the upper bearing surface 16 of the body 4 are thus for example able to form a seat bottom of a seat, as will be described later.

According to one embodiment, the inner volume of the body 4 forms a storage space extending between the side walls 12 and the bottom of which is formed by the base 10 of the body 4.

Such a storage space is for example accessible through at least one opening formed in one of the side walls 12, advantageously the side wall 12 extending toward the front of the vehicle, as shown in the figures, and/or the side wall 12 extending toward the rear of the vehicle.

The opening(s) are for example each closed by a door or a flap that is movable relative to the body 4 between a closed position, in which the door or the flap closes the opening, and an open position, in which the door or the flap frees access to the storage space.

In a variant, and as shown in the figures, at least one drawer 20 extends in the inner volume and defines the storage space. The drawer 20 is translatable toward the front and/or toward the rear so as to allow the movement of the drawer 20 outside the body 4 in order to access the storage space.

The storage space is for example accessible to the passengers seated on the front seats 2 by moving the drawer 20 outside the body 4 toward the front of the vehicle and/or the passengers seated in the back seats 21 by moving the drawer 20 outside the body 4 toward the rear of the vehicle.

In a variant, two drawers can be provided, one moving toward the front and the other toward the rear in order to form two separate storage spaces for the front passengers and for the back passengers.

The storage space(s) is (are) then closed by placing the drawer(s) in the body 4, as shown in the figures.

According to still another variant, the storage space is made accessible by making the upper wall 14 of the body 4 movable relative to the side walls 12 between a closed position, in which the upper wall 14 closes the storage space, and an open position, in which the upper wall 14 frees access to the storage space.

Such a movement is for example obtained by articulating the upper wall 14 to one of the side walls 12, for example the side wall 12 extending toward the rear of the vehicle for a storage space accessible from the front of the vehicle.

According to one embodiment, the body 4 is translatable relative to the floor 5 of the vehicle along the front-rear direction of the vehicle so as to allow a movement of the trim element 1 as a whole toward the front or toward the rear of the vehicle.

To that end, the base 10 of the body 4 is for example mounted on at least one rail 22 extending along the front-rear direction of the vehicle and fastened to the floor 5. Thus, the trim element 1 can be brought closer to the back seats 21 of the vehicle by moving the trim element 1 toward the rear of the vehicle.

The position of the trim element 1 can also be adapted to that of the front seats 2 if the latter are moved toward the rear or toward the front of the vehicle.

Figure 4:
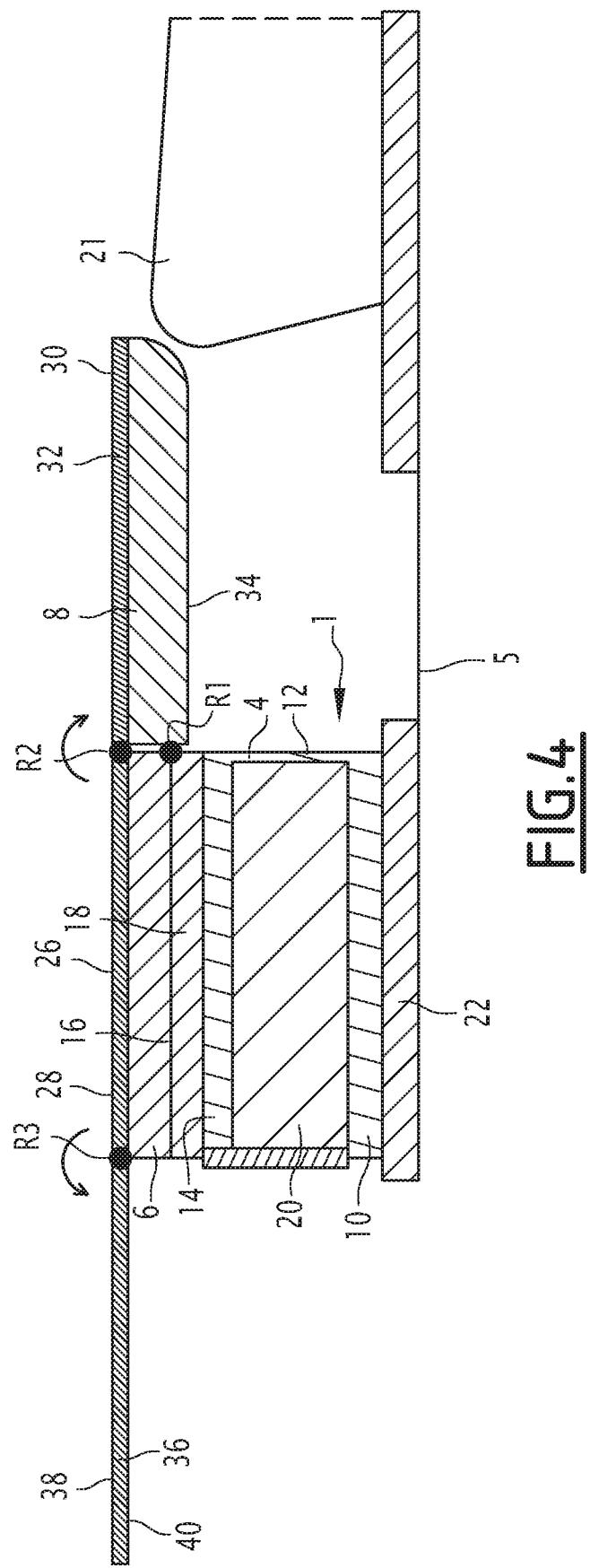
FIG. 4 is a schematic sectional illustration of a trim element according to another embodiment in a first deployed configuration.
Figure 5:
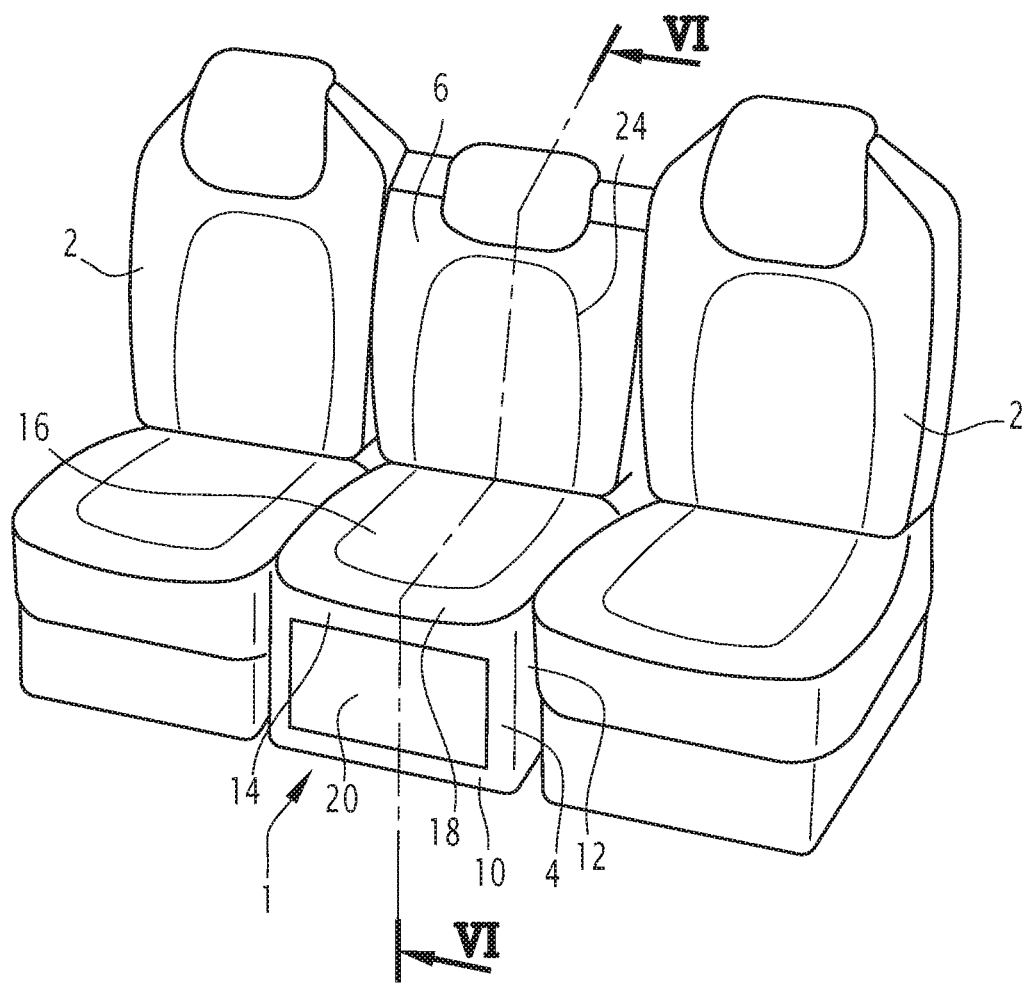
FIG. 5 is a schematic perspective illustration of the trim element of FIG. 1 in a second deployed configuration.
Figure 6:
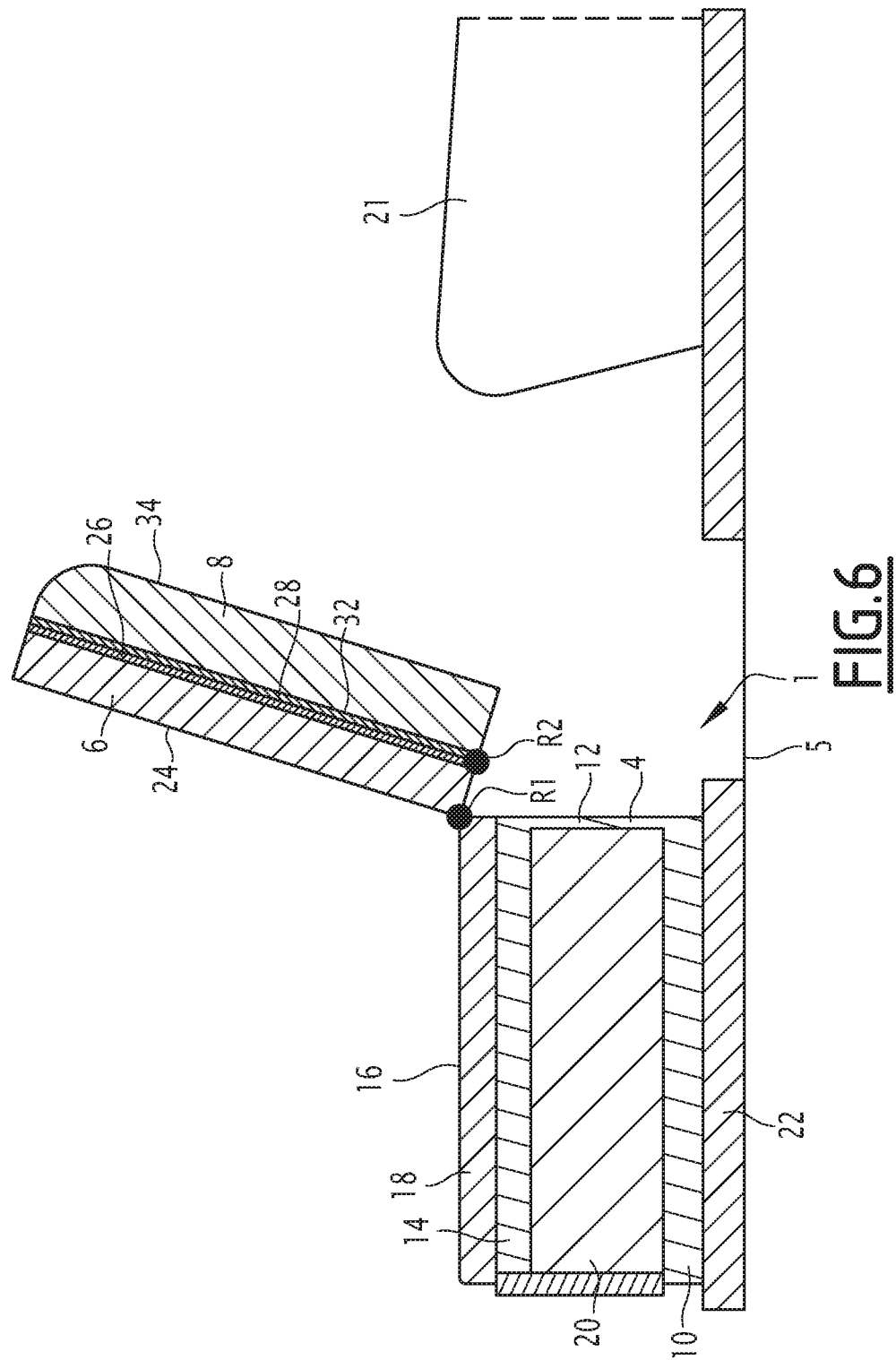
FIG. 6 is a schematic sectional illustration along axis VI-VI of FIG. 5.

The first covering element 6 is mounted rotating relative to the body 4 about a first axis of rotation R1 between a retracted position (FIGS. 1 to 4) and at least one deployed position (FIGS. 5 and 6).

To that end, the first covering element 6 is articulated to the body 4, for example to a framework around the layer of flexible material 18.

The first axis of rotation R1 extends along an edge of the first covering element 6, for example a rear transverse edge extending along the direction corresponding to the width of the vehicle, and a corresponding edge of the body 4.

In the retracted position, the first covering element 6 extends over the upper bearing surface 16 of the body 4.

Figure 2:
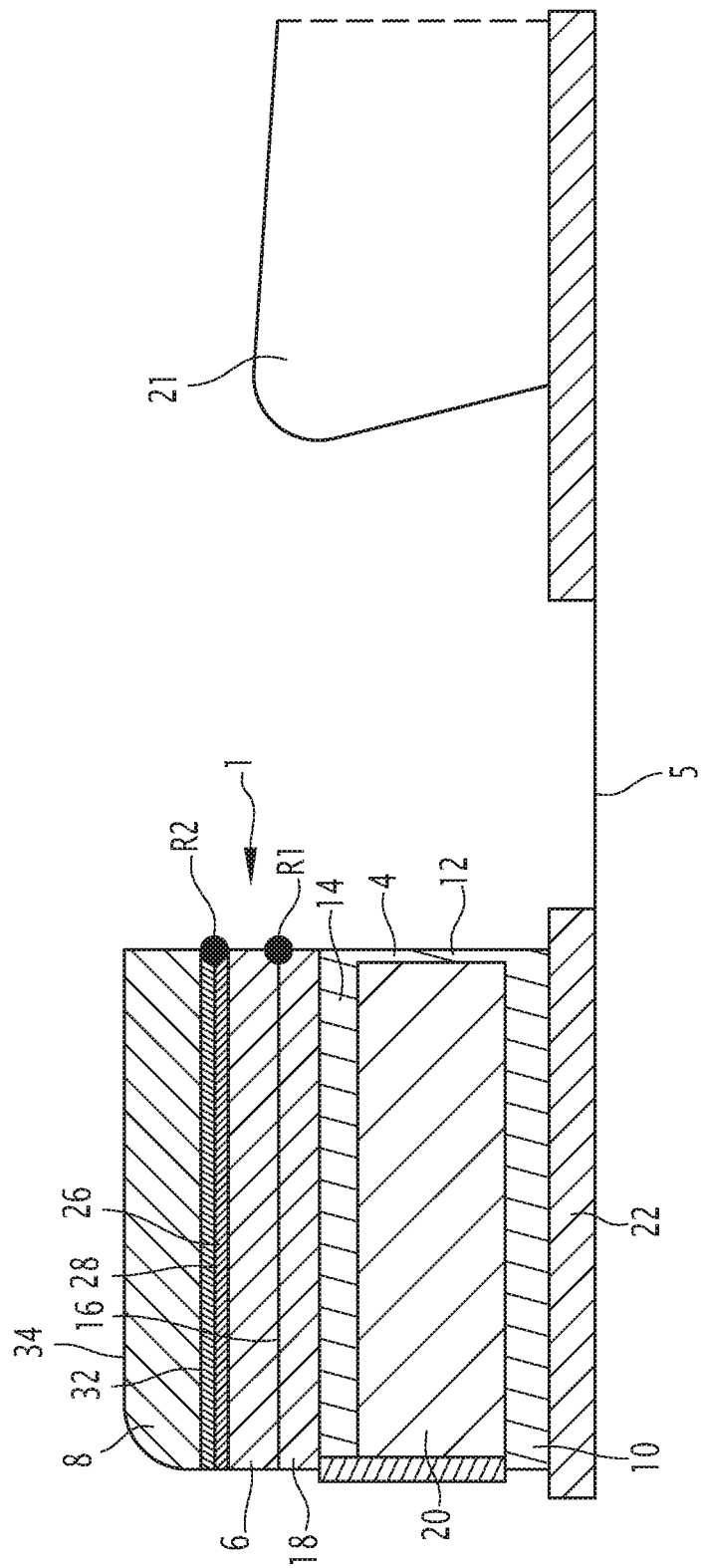
FIG. 2 is a schematic sectional illustration along axis II-II of FIG. 1.

Thus, in this position, the first covering element 6 hides the upper bearing surface 16 of the body 4 and makes this surface inaccessible, that is to say, unusable for a passenger of the vehicle, as shown for example in FIG. 2.

In the deployed position, the first covering element 6 has undergone a rotation about the first axis of rotation R1 so as to separate the first covering element 6 from the upper bearing surface 16 of the body 4 and thus to free access to this upper bearing surface 16, that is to say, to make the latter usable by a passenger of the vehicle, as shown in FIGS. 5 and 6.

According to the embodiment in which the upper bearing surface 16 of the body 2 forms a seat bottom, the first covering element 6 is for example arranged to form the backrest of a seat in the deployed position.

To that end, the angle of rotation between the retracted position and the deployed position is for example between 90° and 120° such that a lower surface 24 of the first covering element 6 forms the surface of a seat backrest against which a passenger can bear when he is seated on the upper bearing surface 16 of the body 4.

Advantageously, the lower surface 24 of the first covering element 6 also has a certain flexibility to provide satisfactory comfort to a person seated on the seat formed by the trim element 1.

To that end, the first covering element 6 is for example formed by a cushion having a certain flexibility.

In order to impart a certain rigidity and strength to the cushion and to offer another function described later, a plate made from a rigid material 26 is for example provided on the back side of the cushion so as to form the upper surface of the first covering element 6, which thus forms a first upper bearing surface 28.

In the deployed position, the upper bearing surface 28 faces the back seats 21 of the vehicle while in the retracted position, the upper bearing surface 28 is for example substantially parallel to the upper bearing surface 16 of the body 4.

It will be noted that in order to form a comfortable seat, it is understood that the upper bearing surface 16 of the body and the lower surface 24 of the first trim element are not necessarily completely flat and that they can be configured to improve the passenger's comfort, as shown in FIGS. 5 and 6.

Figure 7:
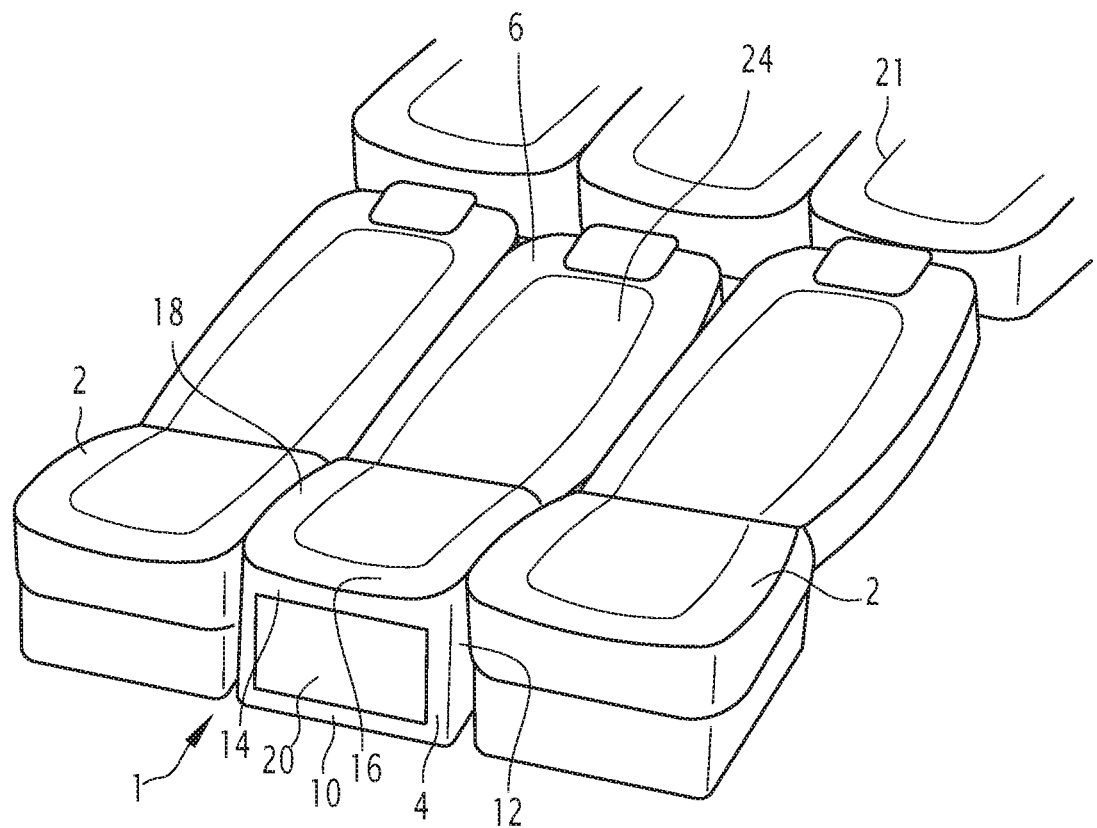
FIG. 7 is a schematic perspective illustration of the trim element of FIG. 1 in a third deployed configuration.

According to one embodiment shown in FIG. 7, the first covering element 6 is further movable into a second deployed position in which the lower surface 24 of the first covering element 6 extends substantially in the continuation of the upper bearing surface 16 of the body 4 and forms a berth therewith.

In other words, in the second deployed position, the lower surface 24 and the upper bearing surface 16 of the body 4 form a single extended bearing surface able to accommodate a passenger in the reclining position.

The angle of rotation about the first axis of rotation R1 between the retracted position and the second deployed position is thus substantially equal to 180°.

It is understood that, according to one embodiment, a plurality of intermediate positions between the deployed positions described above can be adopted by the first covering element 6 to adjust the incline of the backrest formed by the first covering element 6 relative to the seat bottom formed by the body 4.

It is also understood that the first covering element 6 could, in a variant, be formed by a single material, rigid enough to form the first upper bearing surface 28 while having a certain flexibility to form the lower surface 24.

According to one embodiment, a first locking device for locking the first covering element 6 in the retracted position is provided. The passage toward the deployed position is then done by actuating the first locking device to free the movement of the first covering element.

Figure 3:
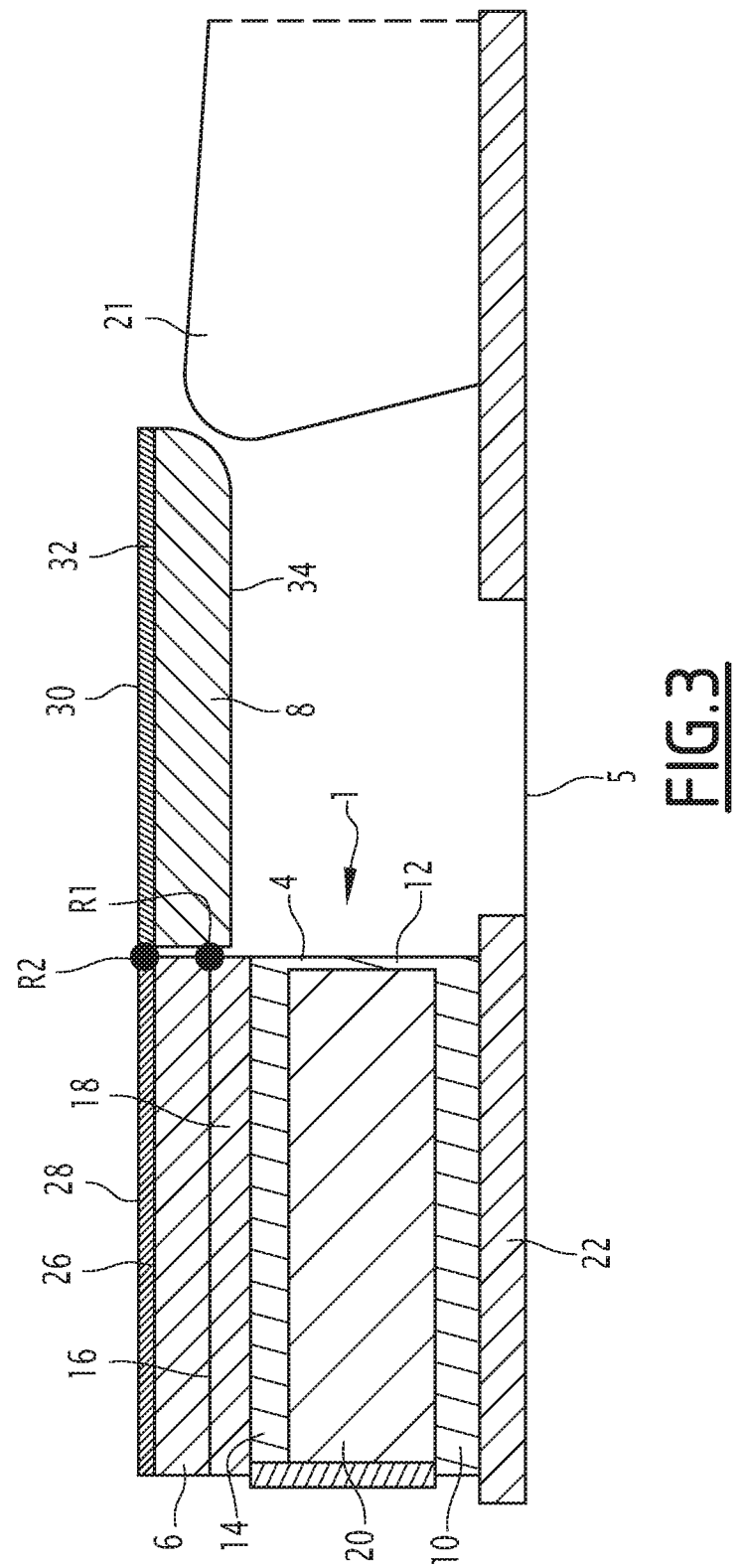
FIG. 3 is a schematic illustration of the trim element of FIG. 2 in a first deployed configuration.

The second covering element 8 is mounted rotating relative to the body 4 about a second axis of rotation R2 between a retracted position (FIGS. 1 and 2) and a deployed position (FIGS. 3 and 4).

To that end, the second covering element 8 is for example articulated to the first covering element 6.

The second axis of rotation R2 extends along an edge of the second covering element 8, for example a rear transverse edge extending along the direction corresponding to the width of the vehicle, and a corresponding edge of the first covering element.

Thus, the second axis of rotation R2 is parallel to the first axis of rotation R1 and extends at a different height from the latter relative to the body 4.

According to the embodiment shown in the figures, the second axis of rotation R2 extends at a height greater than that of the first axis of rotation R1 when the trim element 1 is in the retracted configuration shown in FIGS. 1 and 2.

It will be noted that according to the example mentioned above, the first axis of rotation R1 and the second axis of rotation R2 extend on the same side of the first covering element and the passage from the retracted position to the deployed position of the first covering element 6 and the second covering element 8 is done in the same direction of rotation.

It is, however, understood that the second axis of rotation R2 could be provided at an edge opposite the first covering element 6, that is to say, a front transverse edge such that the passage from the retracted position to the deployed position of the first covering element 6 and of the second covering element 8 is done in opposite directions of rotation, as will be described in reference to the third covering element of the embodiment of FIG. 4.

In the retracted position, the second covering element 8 extends over the first upper bearing surface 28.

Thus, in this position, the second covering element 8 hides the first upper bearing surface 28 and makes this surface inaccessible, that is to say, unusable for a passenger of the vehicle, as shown for example in FIG. 2.

In the deployed position, the second covering element 8 has undergone a rotation about the second axis of rotation R2 so as to separate the second covering element 8 from the first upper bearing surface 28 and thus to free access to this first upper bearing surface 28, that is to say, to make the latter usable by a passenger of the vehicle, as shown in FIGS. 3 and 4.

According to the embodiment in which the first upper bearing surface 28 forms a rigid bearing surface, the second covering element 8 is for example arranged to form a table with the first covering element 6 in the deployed position.

To that end, the lower surface 30 of the second covering element 8, which extends across from the first upper bearing surface 28 in the retracted position, is a rigid surface, for example formed by a plate made from a rigid material 32, for example of the same nature as the plate made from rigid material 26 of the first covering element.

The angle of rotation of the second covering element 8 between the retracted position and the deployed position is substantially equal to 180° such that the lower bearing surface 30 of the second covering element 8 extends in the continuation of the first upper bearing surface 28 and forms a single extended rigid bearing surface therewith forming a table.

As shown in FIG. 3, when the rotation of the second covering element 8 is done toward the rear to enter the deployed position, the part of the table formed by the lower bearing surface 30 of the second covering element 8 is accessible to the passengers seated on the back seats 21 of the vehicle, who can thus share it with the front passengers.

The second covering element 8 further comprises a second upper bearing surface 34, opposite the lower surface 30, which is accessible and usable when the trim element is in the retracted configuration shown in FIGS. 1 and 2. In other words, in the retracted configuration of the trim element 1, the outer upper surface of the trim element 1 is formed by the second upper bearing surface 34.

According to one embodiment, the second upper bearing surface 34 is flexible such that it forms an armrest for the front passengers of the vehicle.

To that end, the second covering element 8 for example comprises a cushion having a certain flexibility extending over the plate of rigid material 32.

In a variant, the second covering element 8 can be formed by a single material, rigid enough to form the lower surface 30 while having a certain flexibility to form the second upper bearing surface 34.

According to one embodiment, a second locking device for locking the second covering element 8 in the retracted position is provided. The passage toward the deployed position is then done by actuating the second locking device to free the movement of the second covering element.

According to the embodiment of FIG. 2, in the retracted position, the lower surface 30 of the second covering element 8 is applied directly on the first upper bearing surface 28.

According to another embodiment shown in FIG. 4, a third covering element 36 is nevertheless inserted between the first covering element 6 and the second covering element 8, such that, in the retracted configuration, a lower surface 38 of the third covering element 36 is applied on the first upper bearing surface 28 and the lower surface 30 of the second covering element 8 is applied on an upper surface 40 of the third trim element 36. The third covering element 36 is for example formed by a plate of rigid material, for example of the same nature as those of the first covering element 6 and the second covering element 8, such that the lower 38 and upper 40 surfaces of the third covering element 36 are rigid bearing surfaces.

The third covering element 36 is rotatable about a third axis of rotation R3 relative to the first covering element 6 between a retracted position (not shown) and a deployed position (FIG. 4) in a direction of rotation opposite the direction of rotation of the second covering element 8.

To that end, the third covering element 36 is for example articulated to the first covering element 6 along a transverse edge of the first covering element opposite the transverse edge to which the second covering element 8 is articulated.

Thus, when the second covering element 8 is articulated to the rear transverse edge of the first covering element 6, the third covering element 36 is articulated to the front transverse edge of the first covering element 6.

In the retracted position, the third covering element 36 extends over the first upper bearing surface 28 and hides the latter so as to make it unusable, even when the second covering element 8 is in the deployed position.

In this case, the second covering element 8 in the deployed position frees access to the upper surface 40 of the third covering element 36, which then serves as bearing surface forming a table with the lower surface 30 of the second covering element 8 if the third covering element 36 is left in its retracted position.

When the second covering element 8 is in the deployed position, the third covering element 36 can be moved into its deployed position, in which the third covering element 36 frees access to the first upper bearing surface 28 and makes the latter usable.

In its deployed position, the third covering element 36 has undergone a rotation about the second axis of rotation R3 so as to separate the third covering element 36 from the first upper bearing surface 28, which makes it usable by a passenger of the vehicle.

The angle of rotation of the third covering element 36 between the retracted position and the deployed position is substantially equal to 180° such that the lower bearing surface 38 of the third covering element 36 extends in the continuation of the first upper bearing surface 28 and in the continuation of the lower surface 30 of the second trim element 8 and forms a single extended rigid bearing surface therewith forming a table.

In other words, the passage of the third covering element 36 into the deployed position makes it possible to increase the dimensions of the table formed when the second covering element 8 is in its deployed position, as shown in FIG. 4.

In a variant (not shown), the trim element comprises third and/or fourth covering elements performing the table function respectively on the left and right sides. These third and/or fourth covering elements are for example articulated on the first covering element 6 on either side of the first upper bearing surface 28 so as to be movable between retracted and deployed positions, like the third covering element 36 previously described.

The trim element 1 described above is thus highly configurable to perform many different functions when it is placed in a retracted configuration and in different deployed configurations.

In the retracted configuration shown in FIGS. 1 and 2, the first covering element 6, the second covering element 8 and, if applicable, the third covering element 36 are in their retracted position. In this configuration, the second upper bearing surface 34 of the second covering element is accessible and usable for example to form an armrest.

In a first deployed configuration, shown in FIG. 3, the first covering element 6 stays in its retracted position and the second covering element 8 is placed in the deployed position. In this configuration, the first upper bearing surface 28 of the first covering element 6 and the lower surface 30 of the second covering element 8 are accessible and usable for example to form a table. When the trim element 1 comprises a third covering element 36, the latter is in its retracted position in the first deployed configuration and it is its upper surface 40 that is accessible and usable to form a table with the lower surface 30 of the second covering element 8.

In a second deployed configuration, shown in FIG. 4 and possibly only when the trim element 1 comprises a third covering element 36, the second covering element 8 and the third covering element 36 are in their deployed position, the first covering element being in its retracted position. In this configuration, the first upper bearing surface 28, the lower surface 30 of the second covering element 8 and the lower surface 38 of the third covering element 36 are accessible and usable to form an extended table having dimensions larger than those of the table formed in the first deployed configuration.

In a third deployed configuration, shown in FIGS. 5 to 7, the second covering element 8 and, if applicable, the third covering element 36 are in their retracted position and the first covering element 6 is in its deployed position. In this configuration, the upper bearing surface 16 of the body 4 and the lower surface 24 of the first covering element 6 are accessible and usable to form a seat (FIGS. 5 and 6) or a berth (FIG. 7).

It is understood that according to other embodiments, by adapting the rigidity and the shape of the different lower and upper surfaces of the body 4 and covering elements 6 and 8, it is possible to provide that the seat is formed by the first and second covering elements 6 and 8 in the second deployed configuration, while the table is formed by the body and the first covering element 6 in the third deployed configuration.

Still other functions can be provided in the trim element 1.

Figure 8:
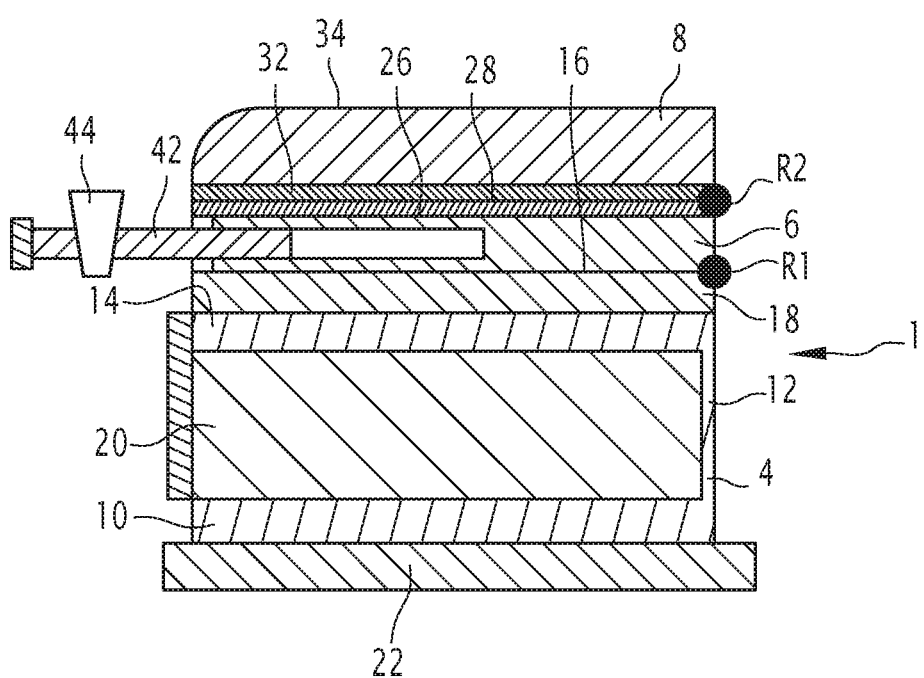
FIG. 8 is a schematic sectional illustration of a trim element according to another embodiment comprising a tray in a deployed position.

To that end, the trim element 1 can, according to one embodiment, comprise one or several trays 42 as shown in FIG. 8. Such a tray 42 is, according to the embodiment shown in FIG. 8, provided in the first covering element 6 and is movable relative to this covering element between a retracted position (FIG. 1), in which the tray 42 extends entirely in the first covering element 6, and at least one deployed position, in which at least part of the tray 42 protrudes from the first covering element 6 outside the latter so as to be accessible to the passengers of the vehicle.

The movement between the retracted position and the deployed position(s) is for example a translational movement in a housing of the first trim element 6 provided to that end. The tray 42 can for example be configured to comprise at least one cavity and/or orifice for receiving an object, such as a container 44, for example a cup, glass, mug or the like.

In a variant or additionally, the tray 42 can comprise a device for recharging a battery of a roaming electronic device positioned on the tray, for example a wireless recharging device.

According to the embodiment shown in FIG. 8, the tray 42 moves forward and/or toward the sides of the vehicle to reach its deployed position and thus to be accessible to the front passengers of the vehicle.

It is, however, understood that in a variant, the tray 42 could move toward the rear to be accessible to the rear passengers. According to another variant, two trays are provided, one deploying toward the front and the other toward the rear.

It is also understood that in a variant or additionally, the tray or another tray could be provided in the body 4 and/or in the second covering element 8.

The invention claimed is:

1. A vehicle trim element comprising:
a body defining an upper bearing surface,
at least one first covering element defining a first upper bearing surface, said first covering element being mounted rotatably about a first axis of rotation between a retracted position, in which the first covering element extends over the upper bearing surface of the body, and at least one deployed position, in which the upper bearing surface of the body is accessible, and
at least one second covering element defining a second upper bearing surface, said second covering element being mounted rotatably about a second axis of rotation between a retracted position, in which the second covering element extends over the first upper bearing surface and in which the second upper bearing surface is accessible, and at least one deployed position, in which the first upper bearing surface is accessible,
the first axis of rotation and the second axis of rotation being substantially parallel to one another and extending at different heights relative to the body,
at least one of the upper bearing surface of the body, the first covering element, and the second covering element having a flexible surface, and
at least one other of the upper bearing surface of the body, the first covering element, and the second covering element having a rigid surface,
wherein the upper bearing surface of the body is a flexible surface, and
wherein a lower surface of the first covering element, opposite the first upper bearing surface, is a flexible surface.

2. The trim element according to claim 1, wherein the first covering element is articulated on the body about the first axis of rotation and wherein the second covering element is articulated on the first covering element about the second axis of rotation.

3. The trim element according to claim 1, wherein, in a first deployed position of the first covering element, the upper bearing surface of the body forms a seat bottom of a seat and the lower surface of the first covering element forms a backrest of said seat, the angle of rotation between the retracted position and the first deployed position of the first covering element being substantially between 90° and 120°.

4. The trim element according to claim 1, wherein the first covering element is movable into at least one second deployed position in which the lower surface of the first covering element extends substantially in the continuation of the upper bearing surface of the body and forms a berth with said upper bearing surface of the body.

5. The trim element according to claim 1, wherein the first upper bearing surface is a rigid upper bearing surface configured to form a table.

6. The trim element according to claim 4, wherein a lower surface of the second covering element, opposite the second upper bearing surface, is a rigid bearing surface and extends in the continuation of the first upper bearing surface in the deployed position of the second covering element and to form a table with said first upper bearing surface.

7. The trim element according to claim 4, further comprising a third covering element comprising a lower surface, said third covering element being articulated to the first covering element about a third axis of rotation extending on an edge of the first covering element opposite an edge on which the first axis of rotation extends, said third covering element being movable between a retracted position, in which the lower surface of the third covering element is applied on the first upper bearing surface, and a deployed position, in which said lower surface of the third covering element extends in the continuation of the first upper bearing surface and forms a table with said first upper bearing surface.

8. The trim element according to claim 1, wherein said trim element is a vehicle center console.

9. A vehicle comprising a trim element according to claim 1.

10. The trim element according to claim 1, wherein a lower surface of the second covering element, opposite the second upper bearing surface, is a rigid bearing surface and extends in the continuation of the first upper bearing surface in the deployed position of the second covering element to form a table with said first upper bearing surface.

11. The trim element according to claim 1, further comprising a third covering element comprising a lower surface, said third covering element being articulated to the first covering element about a third axis of rotation extending on an edge of the first covering element opposite an edge on which the first axis of rotation extends, said third covering element being movable between a retracted position, in which the lower surface of the third covering element is applied on the first upper bearing surface, and a deployed position, in which said lower surface of the third covering element extends in the continuation of the first upper bearing surface and forms a table with said first upper bearing surface.

\* \* \* \* \*